3,594,221
PROCESS OF TREATING FIBROUS MATERIALS
William S. Baldwin, Minneapolis, Minn., assignor to General Mills, Inc.
No Drawing. Filed Mar. 25, 1968, Ser. No. 715,577
Int. Cl. A61l 13/00; C08h 17/06
U.S. Cl. 117—138.5                                       7 Claims

ABSTRACT OF THE DISCLOSURE

Fibrous materials such as cotton cloth are treated with an acid or alkali metal montmorillonite clay and then with a cationic germicide to render the same resistant to bacterial action for extended periods of time.

---

The present invention relates to a process of treating fibrous materials such as paper and fabrics. More particularly, it relates to such a process wherein the fibrous materials are first impregnated with an acid or alkali metal montmorillonite clay and then with a cationic germicide.

Products composed of various fibers are subject to attack by bacteria which not only destroy the structure and cause loss of properties but also spread disease germs and impart undesirable odor and appearance to these products. Cellulose fiber based products such as paper, cotton cloth and sponges are particularly susceptible to bacterial attack.

While various germicides have been developed over the years, treatment of fibrous materials with such materials alone is effective generally only when such treatment is often repeated. In this respect, such germicides are generally removed, for example, after one and not more than a few washings.

I have now discovered that if fibrous materials are first treated with an acid or alkali metal montmorillonite clay and then with a cationic germicide, such materials are resistant to bacterial action for a much longer period of time than if treated with the same amount of the germicide alone. While I do not fully understand the reason for this relatively permanent treatment, it is theorized that the clay attaches to the fibrous materials and provides sites for reaction with the cationic germicides. The germicides thus become more or less permanently attached to the fibers through bonding with the clay and thus remain active even though the fibrous materials are repeatedly washed and the like.

Any of the alkali metal montmorillonite clays can be used but the sodium clays are preferred over the lithium and potassium clays for example. It is also to be understood that the alkali metal montmorillonites occur naturally in an impure form, that is they are mixed with other clay materials. Such mixtures containing substantial amounts of the montmorillonite clays are suitable in the practice of the invention and are included in the term alkali metal montmorillonite clay. Of course, the alkali metal montmorillonites can be used in various purified forms if desired. The acid (or hydrogen) clays are easily obtained by passing an aqueous suspension of the alkali metal clays through a column containing the hydrogen form of a cation exchange resin.

Any of a wide variety of organic cationic germicidal agents can be used in the process of the present invention. Representative of such materials are cocodimethylbenzylammonium chloride, lauryl and other long-chain alkylpyridinium chlorides, octadecenyldimethylethylammonium chloride, octadecenyltrimethylammonium chloride, cetyltrimethylammonium bromide, cetyldimethylethylammonium bromide, cetyldimethylbenzylammonium bromide, various alkylisoquinolinium halides and alkyldimethyl-3,4-dichlorobenzylammonium chlorides, alkoxybenzylpyridinium chlorides, quaternized pyridinesulfonamides, and the like. These and other useful cationic germicides are described in Surface Active Agents and Detergent, by Schwartz et al., vol. II, 1958, pp. 210–227, which disclosure is incorporated herein by reference.

The fibrous materials are first treated with the montmorillonite clay and then with the cationic germicide. Such treatment can be effected by various means wherein a reasonably even distribution of the clay and germicide on the cloth are achieved. The preferred environment involves the use of aqueous dispersions or solutions of the clay and the germicide. In this respect, the fibrous material can be impregnated by first dipping the same in a dilute aqueous dispersion of the clay and then a dilute aqueous dispersion or solution of the germicide. However, any other means including spraying can be used to treat the fibrous materials with the clay and germicide. The dispersions or solutions preferably contain less than about 10% by weight of the clay and germicide and the especially preferred ranges are from about 0.1 to 4.0% and 0.01 to 4.0% by weight respectively. The treatments can be carried out at room temperature although higher and lower temperatures may also be used. Elevated temperatures of up to about 100° C. (at atmospheric pressure) are suitable. The fibrous material can be dried after the clay treatment and prior to the cationic germicide treatment.

The acid or alkali metal montmorillonite clay is used in an amount sufficient to extend the effective life of the cationic germicide by retaining it on the cloth. Ordinarily, the clays are retained on the fibrous materials in an amount of about 0.1 to 0.5% by weight based on the dry weight of the said fibrous materials and thus such amounts are preferred. The cationic germicide is used in an amount sufficient to inhibit bacterial action. Minute amounts up to about 5.0% by weight based on the dry weight of the fibrous material can be used. Preferably the germicide is used in an amount to satisfy or saturate the base exchange capacity of clay retained on the cloth. Numerically, the preferred amounts are 0.05 to .25% by weight. The base exchange capacity of the montmorillonite clays is generally in the range of about 60–130.

The following examples are illustrative of the process of the present invention and are not to be considered as limiting. Unless otherwise indicated, all parts and percentages are by weight.

EXAMPLE I

Prewashed bird's-eye cotton cloth was cut into 8″ x 20″ swatches. One swatch was retained as a control. The remaining swatches were subjected to various treatments including immersion in a 1% aqueous dispersion of sodium montmorillonite clay (oil well grade Wyoming bentonite), immersion in a ½% aqueous solution of cocodimethylbenzylammonium chloride (sold under the trade name Roccal—molecular weight 357.5 with the coco groups being $C_8$ to $C_{18}$ straight chain alkyl as derived from the mixture of acids obtained from coconut oil), rinsing in clear water and drying on a rack. All such treatments were at room temperature unless other indicated and the immersions were for from 1 to 5 minutes to insure thorough wetting of the cloth by the treating solutions. The various treatments were as follows:

| Swatch No.: | Treatment |
|---|---|
| 2 | Immersed in clay dispersion, rinsed and dried. |
| 3 | Immersed in clay dispersion, rinsed, immersed in germicide solution, rinsed and dried. |
| 4 | Same as 3 plus washed in an automatic washer using Tide detergent and dried at room temperature on a rack. |

Swatch
No.:    Treatment

5____ Same as 4 except immersed in the germicide solution at 70° C.
6____ Same as 3 plus being washed in an automatic washer using Tide detergent 10 times with drying between washings.
7____ Same as 5 except washing and drying were repeated 10 times as in 6.
8____ Same as 2 plus 10 washing and drying operations as in 6.

The various treated swatches had the same appearance, hand and odor as the control. All of the swatches were subjected to the standard soil burial test. The results are set forth in the following Table I.

TABLE I

| Swatch No.: | Treatment in brief | Percent strength retention [1] |
|---|---|---|
| Control | | 40 |
| 2 | Clay | 72 |
| 3 | Clay, germicide | 96.5 |
| 4 | As 3, washed once | 81.5 |
| 5 | As 4, germicide at 70° C | 83.5 |
| 6 | As 3, washed ten times | 61.5 |
| 7 | As 5, washed ten times | 79 |
| 8 | As 2, washed ten times | 48.5 |

[1] In the soil burial test, 250 milliliters of unsterilized potting soil are added to 1 liter of tap water and the mixture filtered through a ¼" mesh screen. The slurry is painted on to the samples so that they have six times their original weight. The samples are then inserted into polyethylene bags and squeezed to force the soil evenly throughout the cloth. The bags are tightly closed and stored at approximately 95° F. for 18 days. The samples are then removed from the bags, washed gently to remove the dirt and pulled on a table model Instron Tester at a speed of ½ inch per minute to obtain tensile strength measurements. The ratio of the tensile strength of each degraded sample to its control is calculated and then the average or percent strength retention for each set of specimens is obtained.

EXAMPLE II

The procedure of Example I was essentially repeated except that the swatches were 88" x 36" in size and they were immersed in the clay dispersion and the quaternary solution at 70° C. for approximately five minutes. All of the swatches were washed ten times as in 6 of Example I. The results are set forth in the following Table II.

TABLE II

| Swatch No.: | Treatment in brief | Percent strength retention |
|---|---|---|
| Control | | 69.0 |
| 1 | Germicide | 55.3 |
| 2 | Clay | 83.8 |
| 3 | Clay, germicide | 97.5 |

EXAMPLE III

Example II was essentially repeated except that the various swatches were washed using soap granules (Fels-Naptha) instead of detergent (Tide). The results are set forth in the following Table III.

TABLE III

| Swatch No.: | Treatment in brief | Percent strength retention |
|---|---|---|
| Control | | 47.0 |
| 1 | Germicide | 68.0 |
| 2 | Clay | 56.7 |
| 3 | Clay, germicide | 75.0 |

Four raw untreated cellulose sponges were washed in a beaker with cold running tap water for five minutes each. One sponge was retained as a control. The other three sponges were immersed in a clay dispersion as used in Example I at room temperature for approximately two minutes. They were then washed in a beaker with cold running tap water for about three minutes. One of these sponges was immersed in a 1% aqueous solution of the quaternary germicide as used in Example I for about five minutes and then washed for three minutes in a beaker with running cold tap water. Another of the clay treated sponges was also treated with the quaternary germicide as above except a 0.2% aqueous solution was used. All of the sponges were then soaked in a 10%, wt./wt., solution of milk in water for two minutes. Following this soaking period, the sponges were run through an Atlas Electric Wringer at 25 lbs. pressure. Each sponge was placed on top of a beaker standing in 200 ml. of water in one-half gallon wide mouth bottles. The sponges were then stored at 100° F. and observed periodically to determine how much bacterial action had taken place. The control sponge and that treated only with the clay smelled bad after two days storage. The sponge treated with the clay and the 0.2% germicide solution developed a faint odor after three days storage but it did not become bad until some time after six days storage. After 12 days storage, the sponge treated with the clay and the 1.0% germicide solution began to smell. However, after 24 days storage, neither of the germicide treated sponges smelled nearly as bad as the control and the clay treated sponge.

While my process has been illustrated specifically above in regard to the treatment of cellulosic fibrous materials, it can be used generally on any fibrous materials which are capable of reacting with or in some way bonding with the montmorillonite clay. Illustrative of these various other fibers are nylon, Orlon and Dacron.

It is to be understood that the invention is not to be limited to the exact details of operation or the exact compositions and processes shown and described, as obvious modifications and equivalents will be apparent to those skilled in the art and the invention is to be limited only by the scope of the appended claims.

The embodiments of the invention in which an exclusive property or privilege is claimed are defined as follows:

1. The process of treating fibrous cellulose materials which comprises impregnating such materials with an acid or alkali metal montmorillonite clay and then with an organic cationic germicidal agent.
2. The process of claim 1 wherein the fibrous materials are impregnated with an aqueous dispersion of the clay and an aqueous solution of the germicide.
3. The process of claim 2 wherein the dispersion contains from about 0.1 to 4.0% by weight of the clay and the solution contains from about .01 to 4.0% by weight of the germicide.
4. The process of claim 3 wherein the clay is sodium montmorillonite.
5. The process of claim 4 wherein the germicide is a quaternary ammonium compound.
6. The process of claim 5 wherein the fibrous material is cotton cloth and the quaternary is cocodimethylbenzyl-ammonium chloride.
7. The process of claim 6 wherein the clay is used in an amount of about 0.1 to 0.5% and the quaternary is used in an amount of about 0.05 to 0.25%, such percentages being by weight based on the dry weight of the cotton cloth.

References Cited

UNITED STATES PATENTS

| | | | |
|---|---|---|---|
| 2,195,194 | 3/1940 | Ulrich et al. | 117—139.5 |
| 2,213,643 | 9/1940 | Alton | 117—139.5 |
| 2,293,826 | 8/1942 | Iselin et al. | 117—139.5 |
| 2,334,764 | 11/1943 | Henke et al. | 117—139.5 |
| 2,541,816 | 2/1951 | Glarum et al. | 117—138.5X |
| 2,622,307 | 12/1952 | Cogovan et al. | 117—169 |
| 3,063,128 | 11/1962 | Etchison | 117—137.5X |

WILLIAM D. MARTIN, Primary Examiner

T. G. DAVIS, Assistant Examiner

U.S. Cl. X.R.

117—143, 145, 169